Figure 1:
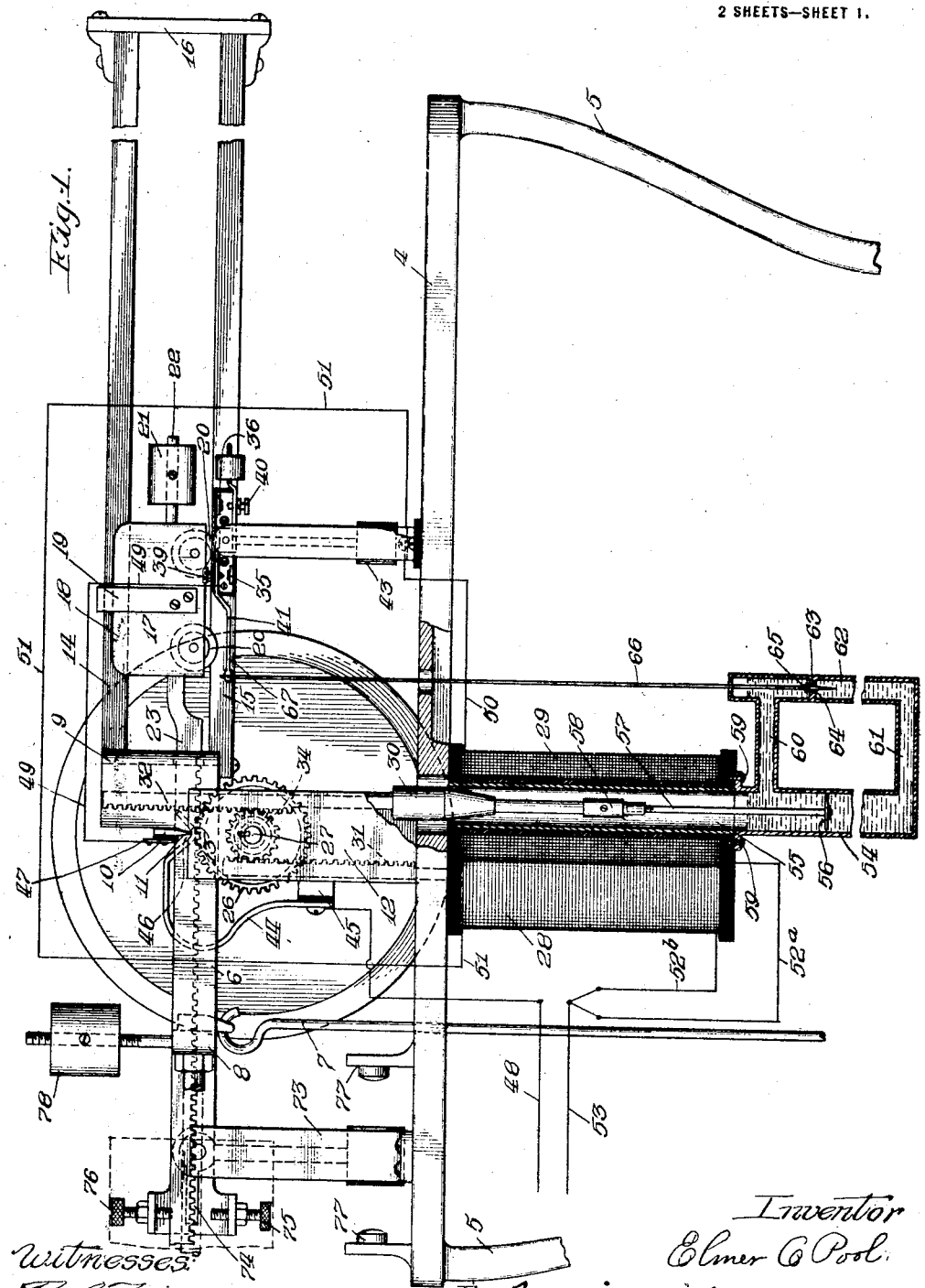

E. C. POOL.
WEIGHING SCALE.
APPLICATION FILED MAR. 23, 1914.

1,283,556.

Patented Nov. 5, 1918.
2 SHEETS—SHEET 1.

Witnesses
Robert Dobberman

Inventor
Elmer C Pool
By
Att'ys.

E. C. POOL.
WEIGHING SCALE.
APPLICATION FILED MAR. 23, 1914.
1,283,556.
Patented Nov. 5, 1918.
2 SHEETS—SHEET 2.
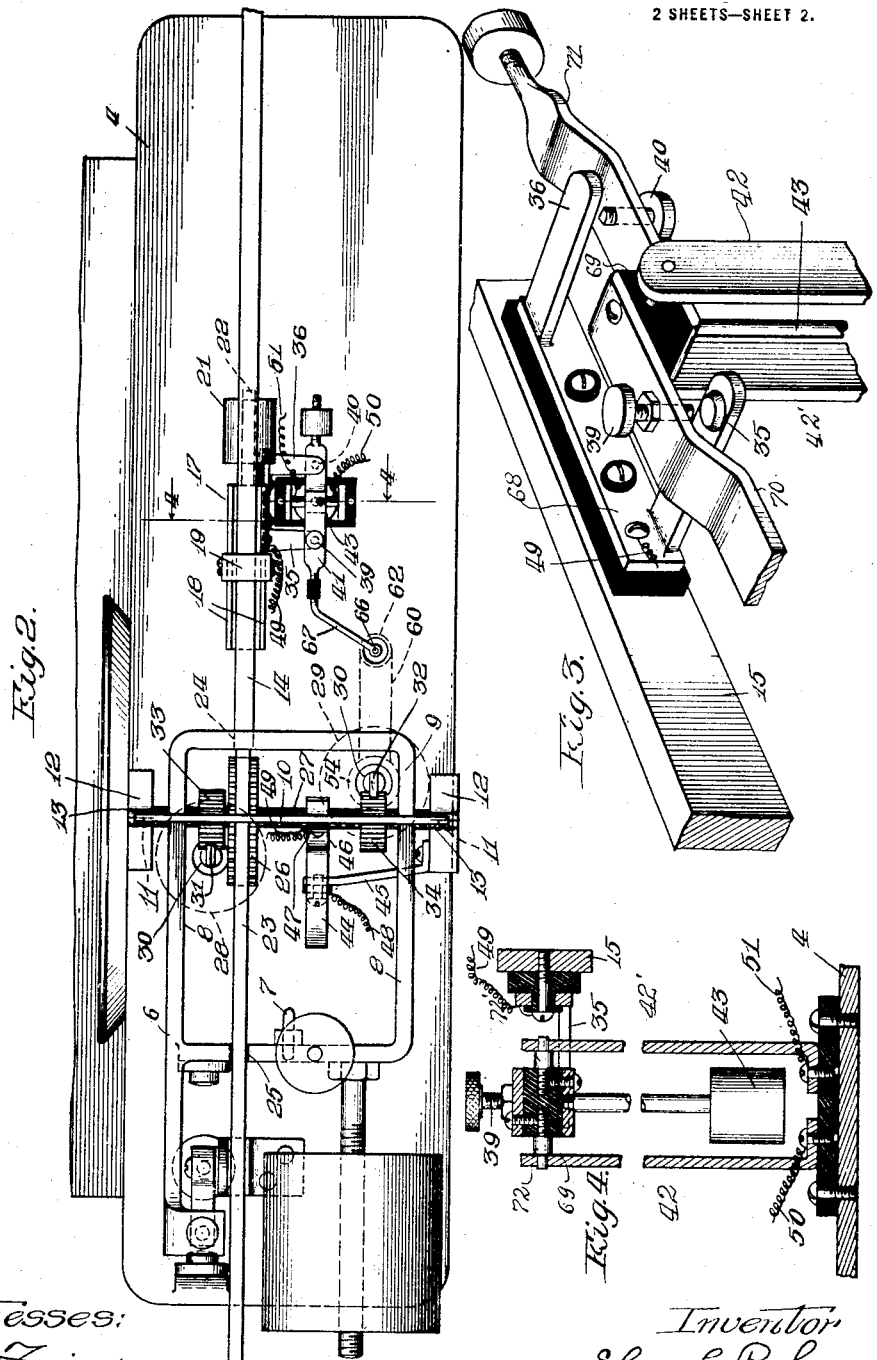
Witnesses:
R. C. Farrington
Robert D. Obberman.
Inventor
Elmer C. Pool
By Rector, Hibben, Davis & Macauley
Attys.

UNITED STATES PATENT OFFICE.

ELMER C. POOL, OF NEW CASTLE, PENNSYLVANIA, ASSIGNOR TO TOLEDO SCALE COMPANY, OF JERSEY CITY, NEW JERSEY, A CORPORATION OF NEW JERSEY.

WEIGHING-SCALE.

1,283,556.  Specification of Letters Patent.  Patented Nov. 5, 1918.

Application filed March 23, 1914. Serial No. 826,672.

*To all whom it may concern:*

Be it known that I, ELMER C. POOL, a citizen of the United States, residing at New Castle, in the county of Lawrence and State of Pennsylvania, have invented new and useful Improvements in Weighing-Scales, of which the following is a specification.

My invention relates more particularly to beam scales in which after the material to be weighed is placed upon the platform or other load receiver, a poise is adjusted along the beam until equilibrium is restored. Various means have been devised for automatically feeding the poise along the beam to counterbalancing position but the difficulty found in scales of this character is that the inertia of the poise and connected parts carries it beyond the position of exact equilibrium when it is moved in that direction by the means provided for the purpose so that it has to be partially returned, and if it is again overthrown its movement must be again reversed until it finally reaches the desired point. These movements of the poise before it comes to rest require considerable time so that the operation of weighing is delayed thereby. The present invention has for its object to avoid these reciprocating movements of the poise and to bring it to rest at the required point of equilibrium by a single movement in one direction. I have shown the invention in connection with a specific form of electrically operated scale. It is to be understood, however, that the specific disclosure is for the purpose of exemplification only and that not only can other forms of scale and operating mechanism be employed but the means for bringing the poise to rest may be also varied from that specifically disclosed without departing from my invention which I have endeavored to define in the following claims in such manner as to distinguish it from the prior art so far as known to me without, however, relinquishing or abandoning any portion thereof.

Referring now to the accompanying drawings, Figure 1 illustrates in front elevation and partly in section on a vertical plane so much of an ordinary platform scale as is necessary to an understanding of my invention, with the latter applied thereto; Fig. 2 is a plan of the same; Fig. 3 is a perspective upon an enlarged scale of a detail which will be described hereinafter, and Fig. 4 a section on an enlarged scale on the line 4—4 of Fig. 2.

Each part is designated by the same reference character wherever it occurs in the several views.

A shelf or bracket 4 supported by uprights 5 from the base of the scale carries the beam 6 and the means for operating the poise and bringing it to rest at the position of equilibrium. A link 7 of the usual character in platform scales connects the beam with the system of leverage within the base of the scale which supports the platform and may be of any usual or approved type. As shown in Figs. 1 and 2 the beam is preferably composed of a hollow frame section 8 which may be cast or otherwise formed and includes an upwardly extending portion 9 upon the left-hand vertical edges of which is secured a transverse bar 10 which is formed at its ends into knife-edges 11 supported by vertical columns 12 rising from the shelf 4. As shown in Fig. 1 concave seats 13 are formed in the upper ends of the uprights 12 to receive the knives. On the outer or right-hand face of the upright portion 9 of the beam casting are secured the parallel horizontal bars 14, 15, which are connected together at their outer ends by a vertical strip 16 and support and guide between them the adjustable poise carriage 17. The latter comprises a pair of side plates 18 connected together by a strip or loop 19 extending over bar 14, and a pair of antifriction rollers 20 are journaled in the side plates and run upon the guide bar 15 upon which the poise carriage is supported. A weight or poise 21 is adjustably mounted upon a rod 22 extending from the front of the carriage and by adjusting its position the scale may be sealed or adjusted. A rack 23 is connected to the carriage and extends to the left thereof, as seen in Figs. 1 and 2, being guided in an opening 24 and slot or groove 25 formed in the transverse members of the beam frame. This rack rests upon and is operated by a gear 26 carried upon a shaft 27 journaled in the uprights 12. The shaft is revolved by solenoids 28, 29, the electrical connections of which will be described later and the cores 30 of which carry racks 31, 32, respectively, which engage pinions 33, 34 upon shaft 27 referred to above. It will be noted that the racks in question engage the pinions upon opposite sides of their centers so that a downward movement of either rack will turn the shaft in an opposite direction from the downward movement of the other rack. Obviously therefore, by energizing the proper solenoid the poise may be moved in either direction as desired.

I will now describe the electrical connections for energizing the solenoids which include a switch device operated by the beam. For this purpose the beam carries a plate 68 mounted thereon but insulated therefrom and formed with brackets 36, 36' extending outwardly from opposite ends thereof and carrying contacts 35. The latter are arranged to engage contact screws 39, 40 projecting in opposite directions from a pivoted arm or walking beam 41 mounted adjacent the beam upon uprights 42, 42'. The walking beam comprises an insulating block 69 and conducting arms 70, 71 mounted upon opposite sides of the block and carrying the contact screws mentioned above and said block carries a pair of trunnions 72 72' mounted upon opposite sides thereof and insulated from each other, which trunnions are mounted in suitable bearings in the uprights 42. By reference to Fig. 4 it will be seen that one of the trunnions is in electrical connection with the arm mounted upon the upper side of the insulating block 69 and the other trunnion is in electrical connection with the arm mounted on the under side of the block, so that the contact screws 39, 40 are respectively in electrical connection with the posts 42, 42'. Post 42 which is in connection with the upper contact screw 39 is also in connection by wire 50 with solenoid 29, mentioned above, while upright 42' is in electrical connection through the conductor 51 with solenoid 28. The other terminals of the solenoids are in connection with the source of electrical energy or with a connection plug through the wires 52$^a$, 52$^b$, respectively, and wire 53. The contact plate 68 mounted upon the beam is connected to the other side of the plug or source of electrical energy and for this purpose a wire 49 extends from said plate to a contact plate 47 which is mounted upon the transverse bar 10 of the beam and is formed with a knife edge in line with the knife edge pivots of the beam but intermediate the same. A spring 44 is mounted upon the stationary transverse bar 45 connecting the standards 12 but insulated therefrom, and is formed with a seat 46 which receives the knife edge of the plate 47. From said spring the conductor 48 extends to the source of current or connection plug. By the construction just described an efficient electrical connection is formed between the contact plate mounted on the beam and the stationary frame of the scale without introducing any material friction into the scale. For the sake of clearness the electrical connections have been diagrammatically shown but it will be understood that they are to be so located on the scale that they will be protected from injury.

The operation of the scale so far as now described will be readily understood. The walking beam is normally maintained in an intermediate position by the pendulum 43 attached thereto. When the scale is in a position of equilibrium the circuits through the solenoids are open at the contacts carried by the walking beam and scale beam respectively. When, however, a load is placed upon the scale platform and the equilibrium of the beam is disturbed it rises making contact between the screw 39 and the contact member 35. A path for the current is thus closed through conductor 48, spring 44, contact plate 47, conductor 49, contact plate 68, contact 35, screw 39, arm 70, trunnion 72, standard 42, wire 50, solenoid 29, wire 52$^a$ and wire 53 to service. The establishment of this circuit energizes the solenoid 29 causing it to retract its core 30 which drawing down the rack 32 revolves shaft 27 carrying gear 26 and through the medium of rack 23 thrusts the movable poise 17 outward along the beam. The movement of the poise continues until the weight of the load is overcome by that of the poise when the beam drops opening the circuit through the contacts 39, 35. The momentum of the parts, however, would unless provision were made against it, carry the poise beyond the position of equilibrium so that the contact screw 40 comes in contact with the arm 36 on the contact plate 68. When this occurs a circuit is closed through the solenoid 28, the path of the current being from service at 48 through the connections heretofore specified to the contact plate 68 thence through contacts 36 and 40, arm 71, trunnion 72, standard 42', wire 51, solenoid 28, wire 52$^b$ and wire 53 to service. The circuit through the other solenoid 29 being now broken, solenoid 28 acts upon its core to draw down the rack 31 and through the connections heretofore mentioned act upon the poise to retract the same. The pivoted walking beam yields under the pressure put upon it by the tilting of the scale beam and when the latter moves toward its position of equilibrium the walking beam by reason of the pendulum 43 follows it to substantially the normal position maintaining the circuit closed in the meantime so that there is no question of the poise failing to be thrown to the balancing position. When due to the inertia of the parts the beam travels beyond its normal position of equilibrium, the walking beam again yields and the action is repeated as above described.

Were no further provision made than that described above the poise would travel back and forth a number of times ultimately reaching the position of equilibrium.

In order to avoid the delay occasioned by the overactuation of the poise I provide the following means: A cylindrical dashpot 54 is mounted in line with the core passage 55 of one of the solenoids, and receives a piston 56 connected by a stem 57 and an adjustable connection 58 to the solenoid core 30. As shown in the drawing the dash-pot is connected by screws 59 to the lower head of the solenoid, although this construction is not essential. The piston 56 fits rather closely within the dashpot and a bypass comprising the horizontal arms 60, 61 and the vertical passage 62 connects the ends of the dashpot on opposite sides of the piston. In Fig. 1 the dashpot is shown broken away but obviously it must be of sufficient length to accommodate the full stroke of the solenoid core. At a suitable point in the vertical member of the bypass a diaphragm 63 is provided in which is formed a valve seat 64 with which an elongated tapered valve 65 coöperates. The last named element is connected by a rod 66 with an extended end 67 of the pivoted switch member or walking beam 41, by which construction the position of the valve or regulator 65 is controlled.

When the switch member 41 is in its intermediate position shown in the figures, the regulator valve is closed or substantially so. When, however, the switch member is engaged by either contact 35 or 36 the regulator valve 65 is withdrawn from its seat a distance depending on the extent to which the switch member is displaced. Where an extended or rapid movement of the poise is required or desirable, as when the load is first put upon the fulcrum, the regulator valve 65 is of course wide open permitting a relatively free flow of the dashpot oil or fluid from one side of the piston to the other and consequently interfering but little with the movement of the solenoid core. As the beam, however, and consequently the switch member approach their normal or intermediate positions the valve returns toward its seat and in the position of equilibrium as stated above, it is closed or substantially so and the movement of fluid prevented. Thus it will be seen that the retardation due to the dashpot which at first is slight increases as the beam approaches its normal or intermediate position and it ultimately brings the scale to rest with the poise in the position of equilibrium with little or none of the back and forth feeding operations referred to above.

As a further provision against excess movement I have shown a pendulum 73 mounted adjacent the short end of the scale beam and carrying an arm 74 adapted to be engaged by screws 75, 76 upon the beam and buffers 77, 77 are mounted upon opposite sides of the pendulum to be engaged thereby to limit the movement of the arm. Thus excess movement of the beam is cushioned and limited. At 78 I have shown an ordinary poise for sealing the scale.

I claim:

1. In a weighing scale and in combination with the beam thereof, a poise adjustable along the beam, means for adjusting the poise and mechanical means for gradually opposing the motion of the poise controlled by the position of the scale beam and increasing in effect as the beam approaches a position of equilibrium.

2. In a weighing scale and in combination with the beam thereof, a poise adjustable longitudinally of the beam, means for adjusting the poise, a dash pot, and connections from the dash pot to the poise-adjusting means for increasingly retarding the movement of the latter as the poise approaches the balancing position and controlled by the position of the scale beam.

3. In a weighing scale and in combination with the beam thereof, a poise adjustable longitudinally of the beam, means for adjusting the poise, a dashpot connected to the poise adjusting means having a by-pass, and means operated from the beam for controlling the by-pass and adapted to retard the flow through the latter increasingly as the beam approaches a position of equilibrium.

4. In a weighing scale and in combination with the beam thereof, a poise adjustable longitudinally of the beam, means for adjusting the poise, a dashpot connected to such means and having a by-pass, and means controlling the by-pass and in turn controlled by the position of the beam and adapted to retard the flow through the by-pass increasingly as the beam approaches a position of equilibrium.

5. In a weighing scale and in combination with the beam thereof, a poise adjustable longitudinally of the beam, means for adjusting the poise, a dashpot connected to such means and having a by-pass, a valve in the by-pass and connections whereby movement of the beam from its normal position serves to increase the effective opening through the valve seat.

6. In a weighing scale and in combination with the beam thereof, a poise adjustable longitudinally of the beam, means for adjusting the poise, a dashpot connected to such means, a by-pass connected to opposite ends of the dashpot, a valve in said by-pass and connections between the valve and beam whereby movement of the latter in either direction from the normal position serves to increase the opening through the valve seat.

7. In a weighing scale and in combination with the beam thereof, a poise adjustable longitudinally of the beam, means for adjusting the poise, a dashpot connected to such means for retarding its action, a by-pass connecting opposite ends of the dashpot, a diaphragm in the by-pass having a valve seat formed therein, an elongated tapering valve coöperating with said valve seat to control the flow of liquid therethrough, and connections between the valve and beam whereby movement of the latter from the normal position enlarges the effective passage through the valve seat.

8. In a weighing scale and in combination with the beam thereof, a poise adjustable longitudinally of the beam, means for adjusting the poise, a dashpot connected to said means for retarding its action, a by-pass connecting the opposite ends of the dashpot, a valve in said by-pass, connections between the valve and beam whereby movement of the latter from the normal position increases the effective opening through the valve seat and means independent of the beam for returning the valve to its seat.

9. In a weighing scale and in combination with the beam thereof, a poise adjustable longitudinally of the beam, means for adjusting the poise, a dashpot connected to the poise adjusting means to retard the action of the same, a by-pass connecting opposite ends of the dashpot, a valve in said by-pass, a pivoted arm adapted to be engaged by the beam and connected to the valve and means on the beam adapted to engage the arm to withdraw the valve from its seat.

10. In a weighing scale and in combination with the beam thereof, a poise adjustable longitudinally of the beam, means for adjusting the poise, a dashpot connected to said means for retarding the operation thereof, a by-pass connecting opposite ends of the dashpot, a valve controlling the by-pass, a pivoted arm connected to the valve and arranged to be rocked by a movement of the beam and means tending to restore the arm to normal position.

11. In a weighing scale and in combination with the beam thereof, a poise adjustable longitudinally of the beam, means for adjusting the poise, a dashpot connected to said means for retarding the operation thereof, a by-pass connecting opposite ends of the dashpot, a valve controlling the by-pass, a pivoted arm connected to the valve and arranged to be rocked by a movement of the beam and means tending to restore the pendulum to normal position.

12. In a weighing scale and in combination with the beam thereof, a poise adjustable longitudinally of the beam, means for adjusting the poise, a dashpot connected to said means for retarding the same, a by-pass connecting opposite ends of the dashpot, a valve in the by-pass, a pivoted arm connected to the valve, means on the beam adapted to engage the arms on opposite sides of its center to rock it in the same direction irrespective of the direction of movement of the beam and means for returning the arm to normal position.

13. In a weighing scale and in combination with the beam thereof, a poise adjustable longitudinally of the beam, means for adjusting the poise, a dashpot connected to said means for retarding the same, a by-pass connecting opposite ends of the dashpot, a valve in the by-pass, a pivoted arm connected to the valve, means on the beam adapted to engage the arms on opposite sides of its center to rock it in the same direction irrespective of the direction of movement of the beam and means for returning the pendulum to normal position.

14. In a weighing scale and in combination with the beam thereof, a poise adjustable longitudinally of the beam, electromagnetic means for moving the poise, a pivoted arm, contacts carried by the arm and beam respectively for controlling the circuit through the electromagnetic means, a dashpot connected to the electro-magnetic means for retarding the operation thereof, a by-pass connecting opposite ends of the dashpot, a valve in the by-pass and connections from the valve to the pivoted arm.

15. In a weighing scale and in combination with the beam thereof, a poise adjustable longitudinally of the beam, a pair of electro-magnetic means for operating the poise in opposite directions, a pair of contacts on the beam, a pivoted arm carrying a pair of contacts adapted to coöperate respectively with the contacts on the beam to close the circuits through the respective electro-magnetic operating means.

16. In a weighing scale and in combination with the beam thereof, a poise adjustable longitudinally of the beam, a pair of electro-magnetic means for operating the poise in opposite directions, a dashpot connected to one of said electro-magnetic means for retarding the movement thereof, a by-pass connecting opposite ends of the dashpot, a valve in the by-pass, a pivoted arm having a pair of contacts arranged on opposite sides of its pivot, a pair of contacts on the beam arranged to engage the respective contacts upon the arm, electrical connections between said contacts and electro-magnetic means whereby movement of the beam in one direction will close the circuit through one of the electro-magnetic means and movement of the beam in the other direction will close the circuit through the other electro-magnetic means, and connections between said arm and valve.

17. In a weighing scale and in combination with the beam thereof, a poise adjustable longitudinally of the beam, a pair of solenoids, one of which is connected and adapted to adjust the poise in one direction and the other of which is connected and adapted to adjust the poise in the other direction, a pivoted arm, contacts on opposite arms of the axis thereof, a pair of contacts on the beam adapted to engage respectively the contacts upon the arm, and electrical connections between the solenoid and contacts whereby the upward movement of the beam will close the one pair of contacts and the circuit through a solenoid to cause the poise to move outwardly along the beam and a downward movement of the beam will close the other pair of contacts and the circuit through the other pair of contacts and solenoid.

18. In a weighing scale and in combination with the beam thereof, a poise adjustable longitudinally of the beam, a pair of solenoids adapted to respectively operate the poise in opposite directions, a pivoted arm, a pendulum on the arm for normally maintaining it in position, contacts on said arm on opposite sides of its pivot, contacts on the beam adapted to engage the contacts on the arm respectively, connection from the contacts to the solenoids whereby movement of the beam in one direction will close the circuit through one of the solenoids and movement of the beam in the other direction will energize the other solenoid, a dashpot, the piston whereof is connected to the core of one of the solenoids, a by-pass connecting opposite ends of the dashpot, a valve in the by-pass and connections from the valve to the pivoted arm.

19. In a weighing scale and in combination with the beam thereof, a poise adjustable longitudinally of the beam, means for adjusting the poise, a dash pot connected to the poise-adjusting means for retarding the movement of the latter, and means for automatically increasing the retarding action of the dash pot as the poise approaches a position of equilibrium.

20. In a weighing scale and in combination with the beam thereof, a poise adjustable longitudinally of the beam, means for adjusting the poise, a dash pot connected to the poise-adjusting means for retarding the movement of the latter, and means controlled by the movement of the beam for increasing the retarding action of the dash pot as the poise approaches a position of equilibrium.

21. In a weighing scale, a beam, a poise automatically adjustable along the beam, and electrically-actuated poise-adjusting means including a solenoid coil, a movable core therefor, a dash pot arranged in alinement with the solenoid coil, and having a piston and a connection between the piston of said dash pot and said core.

22. In a weighing scale, a beam, a poise automatically adjustable along the beam, and electrically-actuated poise-adjusting means including a vertically-disposed solenoid coil, a movable core therefor, a dash pot arranged below the solenoid coil, and having a piston and a connection between the piston of said dash pot and said core.

23. In a weighing scale, a beam, a poise automatically adjustable along the beam, and electrically-actuated poise-adjusting means including a vertically-disposed solenoid coil, a movable core therefor, a dash pot arranged below the solenoid coil, and having a piston and an adjustable connection between the piston of said dash pot and said core.

24. In a weighing scale, a beam, a poise automatically adjustable along the beam, poise-adjusting means including a shaft mounted adjacent the beam, means including a pair of solenoids, connections whereby the solenoids are automatically operated upon movement of the beam to rotate said shaft, a gear on said shaft, and a rack secured to said poise and meshing with said gear.

25. In a weighing scale, a beam, a poise automatically adjustable along the beam, poise-adjusting means including a shaft mounted adjacent the beam, means automatically operated upon movement of the beam to rotate said shaft in opposite directions including a pair of vertically-disposed racks, pinions fixed on said shaft and meshing with said racks, a gear fixed upon said shaft, and a horizontally-disposed rack secured to said poise and meshing with said gear.

ELMER C. POOL.

Witnesses:
SARA E. BAIRD,
J. CLYDE GILFILLAN.

Copies of this patent may be obtained for five cents each, by addressing the "Commissioner of Patents, Washington, D. C."